United States Patent [19]
Latos et al.

[11] Patent Number: 5,512,811
[45] Date of Patent: Apr. 30, 1996

[54] STARTER/GENERATOR SYSTEM HAVING MULTIVOLTAGE GENERATION CAPABILITY

[75] Inventors: Thomas S. Latos, Huntley; Michael R. Hernden, Rockford, both of Ill.

[73] Assignee: Sundstrand Corporation, Rockford, Ill.

[21] Appl. No.: 185,661

[22] Filed: Jan. 21, 1994

[51] Int. Cl.$^6$ ................ F02N 11/04; H02P 6/00
[52] U.S. Cl. .................. 322/10; 322/29; 318/254
[58] Field of Search ................ 322/10, 29; 318/254

[56] References Cited

U.S. PATENT DOCUMENTS

| | | | |
|---|---|---|---|
| 3,902,073 | 8/1975 | Lafuze | 290/46 |
| 3,908,161 | 9/1975 | Messenger | 322/29 |
| 4,093,869 | 6/1978 | Hoffmann et al. | 290/31 |
| 4,330,743 | 5/1982 | Glennon | 322/10 |
| 4,481,459 | 11/1984 | Mehl et al. | 322/10 |
| 4,830,412 | 5/1989 | Raad et al. | 290/31 |
| 4,833,356 | 5/1989 | Bansal et al. | 310/207 |
| 5,028,803 | 7/1991 | Reynolds | 290/31 |
| 5,036,267 | 7/1991 | Markunas et al. | 332/10 |
| 5,055,764 | 10/1991 | Rozman et al. | 332/10 |
| 5,202,613 | 4/1993 | Kruse | 318/254 |
| 5,221,881 | 6/1993 | Cameron | 318/254 |
| 5,349,257 | 9/1994 | Hernden | 310/68 |

Primary Examiner—Steven L. Stephan
Assistant Examiner—Nicholas Ponomarenko
Attorney, Agent, or Firm—Jeffery J. Makeever

[57] ABSTRACT

An electric power starter/generator, for converting electrical energy from a remote dc electrical power source to mechanical energy to start a turbine engine in the start mode, and for converting mechanical energy from the turbine engine to electrical energy to power utilization equipment in the generate mode, comprises a shaft for transferring rotational mechanical energy between the electric power starter/generator and the turbine engine, a permanent magnet synchronous machine having a rotor driveably coupled to the shaft and a stator. The permanent magnet synchronous machine produces polyphase ac electric power when driven as a generator, and rotational mechanical energy when driven as a motor. A bidirectional ac-dc power converter having a dc and an ac input/output produces variable frequency polyphase ac excitation from the dc electrical energy at the dc input/output to drive the permanent magnet synchronous machine as a brushless dc motor to generate rotational mechanical energy to start the turbine engine during the start mode. The power converter alternately produces dc electrical energy from the polyphase ac electrical energy generated by the permanent magnet synchronous machine when driven by the turbine engine during the generate mode.

29 Claims, 8 Drawing Sheets

FIG. 1
STARTER/GENERATOR SYSTEM

FIG. 2

FIG. 3
START MODE POWER FLOW

FIG. 4
GENERATE MODE POWER FLOW

FIG. 5
PERMANENT MAGNET SYNCHRONOUS MACHINE

FIG. 6
SINGLE WIRE WAVE-WOUND
WINDING CONFIGURATION

FIG. 7

PMG STATOR SLOT AND WINDINGS

FIG. 8
MULTI-POLE AC SYNCHRONOUS GENERATOR AND CONTROLLER 5,512,811

STARTER/GENERATOR SYSTEM HAVING MULTIVOLTAGE GENERATION CAPABILITY

FIELD OF THE INVENTION

The present invention relates generally to electric power starter/generator systems and more particularly to a permanent magnet generator based electric power starter/generator system capable of low voltage excitation in the start mode, and primary and secondary power generation in the generate mode.

BACKGROUND ART

A typical aircraft auxiliary power unit (APU) consists of a turbine engine, a dc starter/clutch, and a 400 Hz electrical generator. It is desirable to combine the starter function and the generator function in order to reduce the number of auxiliary power unit accessories. A common approach to this problem is to drive the 400 Hz electrical generator as a motor to start the auxiliary power unit.

One such system utilizing this approach is disclosed in Hoffman et al. U.S. Pat. No. 4,093,869. This patent discloses generating apparatus in the form of a pilot exciter, a main exciter, and a main generator all of which are coupled to a prime mover. In the generating mode, the pilot exciter provides field current for the main exciter, which in turn generates field current for the main generator. When it is desired to utilize the generating apparatus to start the prime mover, a quadrature axis winding disposed about the stator of the main exciter is energized by a single phase alternating current. A corresponding alternating current is induced by transformer action within the armature of the exciter, and is utilized to supply main generator field current. At the same time, polyphase alternating current excitation is applied to the armature of the main generator to establish a rotating magnetic field which interacts with the stator magnetic field set up by the field current in the main generator. This interaction produces a mechanical turning force which is utilized to start the prime mover.

Messenger U.S. Pat. No. 3,908,161 discloses a generating system wherein a three-phase altering voltage is applied to a set of exciter field windings which are connected in wye configuration. The exciter operates as a rotating transformer, with the armature current of the exciter being rectified and applied to the field winding of the main generator to cause the main generator to operate as a motor, and thereby start a prime mover. Once the prime mover has been started, the rotating transformer is converted back to a brushless exciter by connecting the field windings in series and applying the dc voltage thereto from the output of a permanent magnet generator, or PMG. Another patent which discloses a system similar to the Messenger device is Lafuze U.S. Pat. No. 3,902,073.

The systems described above suffer from disadvantages. The Hoffman et al. system requires that a separate additional quadrature axis winding be disposed in the exciter stator, such winding being utilized only when the system is operating in the starting mode. The Messenger and Lafuze patents require that the exciter stator windings be switched from a series connection to a wye connection when it is desired to utilize the main generator to start the prime mover. Further, each system described above requires an external source of ac power, which may not be available on the aircraft. Typically, however, only a 28 volt dc battery is available when a start is required.

A device which eliminates the necessity for a starter motor and allows start power to be delivered from the battery is disclosed in Glennon U.S. Pat. No. 4,330,743 which is assigned to the assignee of the instant application. A reversible ac to dc converter receives external dc power and supplies ac power to drive an alternator as a motor to start a prime mover through a torque converter connected thereto.

The system requires sophisticated current control circuits to handle the large currents that must be delivered to the alternator to cause it to act as a motor. Furthermore, in the event that the alternator is a wound field machine, the field windings must be switched to a different configuration to allow it to operate as an induction motor.

A further system which allows auxiliary power unit start from a low voltage dc supply is described in Markunas U.S. Pat. No. 5,036,267 and Rozman et al. U.S. Pat. No. 5,055,764, which are also assigned to the assignee of the instant invention. This system requires an excitation inverter as well as a main inverter to operate the synchronous generator as a brushless dc motor to allow the machine to start the auxiliary power unit. Furthermore, an autotransformer is required to accelerate the machine to 100 percent operating speed as the voltage supplied through the main inverter is insufficient.

A further system which eliminates the necessity for an excitation inverter is described in Mehl et al. U.S. Pat. No. 4,481,459, which is assigned to the assignee of the instant invention. This system allows for motor start capability from a low voltage dc source through a dc to dc converter which provides input to an inverter which drives the permanent magnet generator as a brushless dc motor. Once the generator attains a certain operating speed through excitation of the permanent magnet generator, the power supply to the permanent magnet generator is removed, and the main generator is supplied power from a motor drive to cause the generator to act as a synchronous motor. A torque converter is then commanded to transfer motive power from the generator to start the prime mover.

SUMMARY OF THE INVENTION

It is the principle object of the instant invention to provide a new and improved electric power starter/generator. More specifically, it is the principle object of the instant invention to provide a electric power starter/generator which is capable of starting a turbine engine from the low voltage energy of an aircraft battery in the start mode, and which is capable of generating both primary and secondary power in the generate mode.

This electric power starter/generator, for converting electrical energy from a remote dc electrical power source to mechanical energy to start a turbine engine in the start mode, and for converting mechanical energy from the turbine engine to electrical energy to power utilization equipment in the generate mode, comprises a shaft for transferring rotational mechanical energy between the electric power starter/generator and the turbine engine, and a permanent magnet synchronous machine having a rotor driveably coupled to the shaft and a stator. The permanent magnet synchronous machine produces polyphase ac electric power when driven as a generator, and rotational mechanical energy when driven as a motor. A bidirectional ac-dc power converter having a dc and an ac input/output produces variable frequency polyphase ac excitation from the dc electrical energy at the dc input/output to drive the permanent magnet synchronous machine as a brushless dc motor to generate rotational mechanical energy to start the turbine engine during the start mode. The power converter alternately produces dc electrical energy from the polyphase ac electrical energy generated by the permanent magnet synchronous machine when driven by the turbine engine during the generate mode.

The electric power starter/generator further comprises a multi-pole ac synchronous generator having a rotor which is driveably coupled to the shaft, and a stator having polyphase multi-pole windings. The ac synchronous generator produces polyphase ac electric power when driven by the turbine engine via the shaft during the generate mode.

Other objects and advantages of the present invention will be apparent upon reference to the accompanying description when taken in conjunction with the following drawings.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings, in which:

DESCRIPTION OF THE PREFERRED EMBODIMENTS

The electric power starter/generator of the instant invention has two discreet operational modes. The first is starting the auxilliary power unit engine and the second is the electrical power generation from the mechanical power provided by the auxilliary power unit. The electric power starter/generator of the instant invention functionally replaces the traditional dc brush series starter motor/clutch, and the more complex systems described above which were employed to accelerate the auxiliary power unit from standstill to 100 percent speed.

Figure 1:
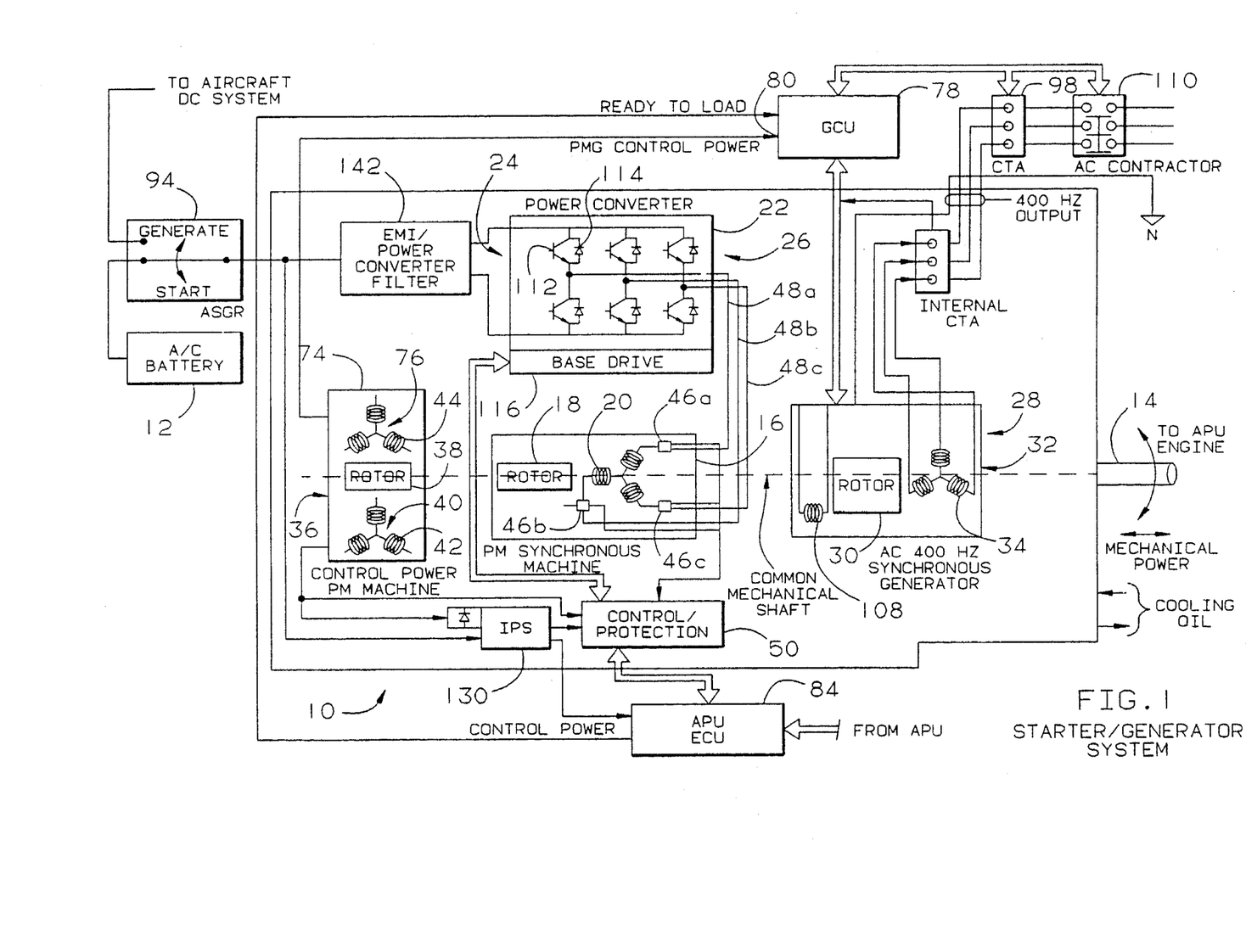
FIG. 1 is a single line schematic diagram of the electric power starter/generator of the instant invention.

This electric power starter/generator, or integrated starter/generator package (ISGP) 10, as shown in FIG. 1, converts electrical energy from a remote dc electrical power source, such as an aircraft battery 12 or other 28 volt dc source, to mechanical energy to start the auxiliary power unit turbine engine (not shown) in the start mode, and rotational mechanical energy from the turbine engine to electrical energy to power utilization equipment (not shown) in the generate mode. The electric power starter/generator 10 comprises mechanical energy coupling means, such as a shaft 14 (and possibly a gearbox depending on the turbine engine configuration), for transferring rotational mechanical energy between the electric power starter/generator 10 and the turbine engine, and a permanent magnet synchronous machine 16 having a rotor 18 driveably coupled to the shaft 14, and a stator 20. The permanent magnet synchronous machine 16 produces polyphase ac electric power when driven as a generator, and rotational mechanical energy when driven as a motor. In the preferred embodiment of the instant invention, the permanent magnet synchronous machine 16 produces three-phase electric power. A bidirectional ac-dc power converter 22 having a dc 24 and an ac 26 input/output produces variable frequency polyphase ac excitation from the dc electrical energy at the dc input/output 24. This polyphase ac excitation drives the permanent magnet synchronous machine 16 as a brushless dc motor to generate rotational mechanical energy to start the turbine engine during the start mode. In the preferred embodiment of the instant invention, the polyphase ac excitation comprises three-phase electric power. The bidirectional ac-dc power converter 22 alternately produces dc electrical energy from the polyphase ac electrical energy generated by the permanent magnet synchronous machine 16 when driven by the turbine engine during the generate mode.

The electric power starter/generator 10 further comprises a multi-pole ac synchronous generator 28 having a rotor 30 which is driveably coupled to the shaft 14, and a stator 32 having polyphase multi-pole windings 34. The ac synchronous generator 28 produces polyphase ac electric power when driven by the turbine engine via the shaft 14 during the generate mode. In the preferred embodiment of the instant invention, the polyphase ac electric power comprises three-phase electric power.

Further, in accordance with the instant invention, the electric power starter/generator 10 further comprises a control permanent magnet generator 36 having a rotor 38 driveably coupled to the shaft 14, and a stator 40 having polyphase multi-pole windings 42. The control permanent magnet generator 36 produces polyphase ac electric power when driven by the turbine engine via the shaft 14 in the generate mode. In the preferred embodiment of the instant invention, the polyphase ac electric power comprises three-phase electric power. Phase current sensors 46a, 46b, 46c, preferably capable of sensing dc current, sense the electrical current generated by each phase 48a, 48b, 48c of the permanent magnet synchronous machine 16, and generate output phase current sense signals of proportional magnitude to the phase current sensed.

Figure 2:
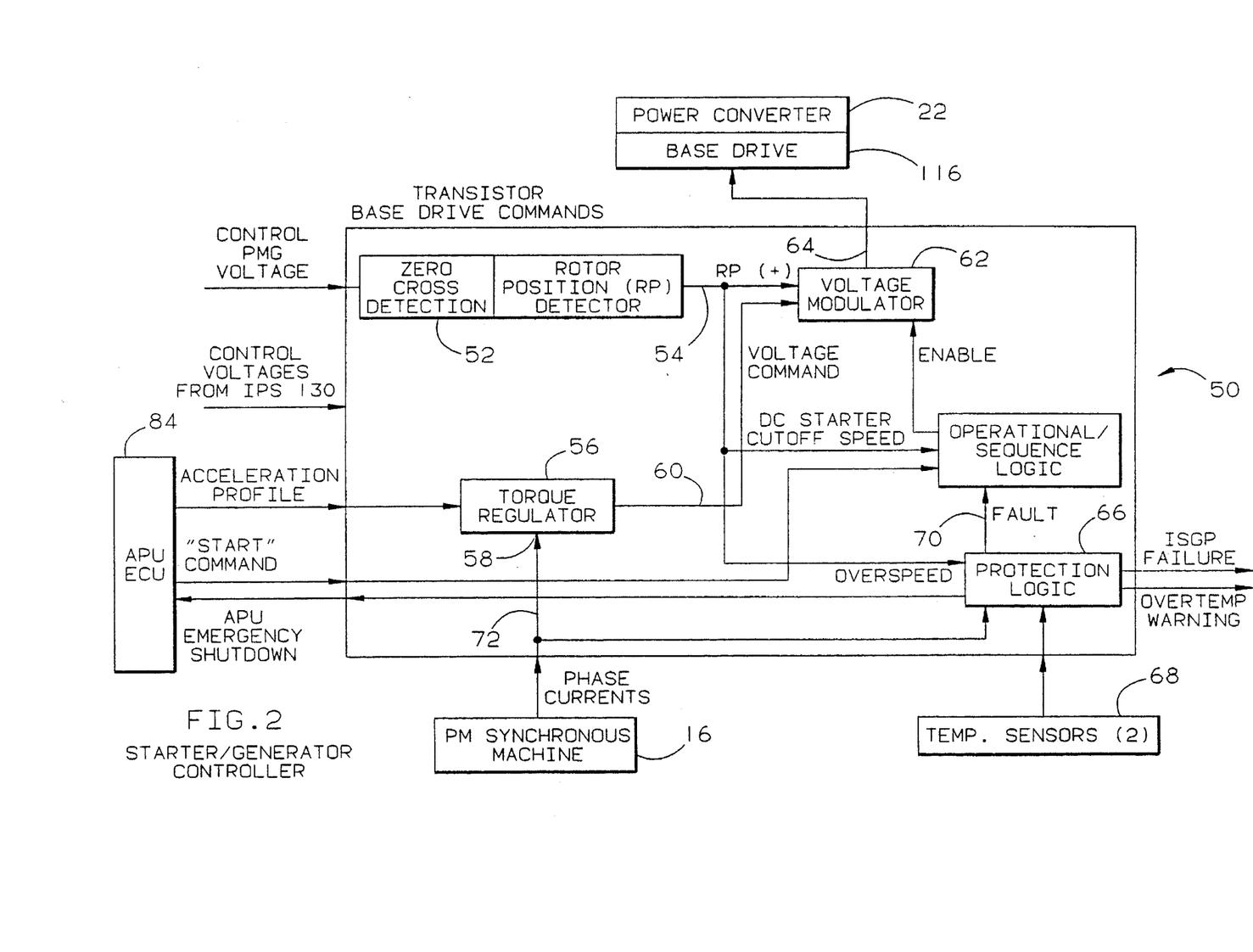
FIG. 2 is a single line block diagram of the electric power starter/generator controller of the instant invention.

A start mode controller 50, in communication with the bidirectional ac-dc power converter 22, and responsive to the three-phase ac electric power generated by the control permanent magnet generator 36 and to the output phase current sense signals, controls the rate of generation of rotational mechanical energy delivered to the turbine engine. This rotational mechanical energy results in motor torque, and hence acceleration of the turbine engine in the start mode. As shown in FIG. 2, the start mode controller 50 comprises rotor position detection means 52 coupled to the control permanent magnet generator 36 for sensing the position of its rotor 38 (FIG. 1). This rotor position detection means 52 generates a rotor position control signal on line 54 which is used to ensure phase lock of the variable frequency three-phase ac excitation produced by the bidirectional ac-dc power converter 22 (see FIG. 1) with the permanent magnet synchronous machine 16 during the start mode.

Preferably, the start mode controller 50 further comprises a torque regulator 56 having a phase current input 58 coupled to the phase current sensors 46a, 46b, 46c (FIG. 1) for monitoring the output phase current sense signals. This torque regulator 56 produces an output torque regulation control signal on line 60 based on the output phase current sense signals and on a predetermined acceleration profile. The start mode controller 50 further comprises a modulator 62 coupled to the rotor position detection means 52 via line 54 and to the torque regulator 56 via line 60. The modulator 62 produces power converter drive commands on line 64 responsive to the rotor position control signal on line 54 and to the output torque regulation control signal on line 60.

The start mode controller 50 further comprises protection logic means 66 for detecting failures within the electric power starter/generator 10. These protection logic means 66 comprise at least one temperature sensor 68 positioned within the electric power starter/generator 10 for monitoring the temperature of the electric power starter/generator 10. The protection logic means 66 generates an output protection fault signal on line 70 when the temperature exceeds a predetermined threshold. Further, the protection logic means 66 monitor the output phase current sense signals on line 72, and generate the output protection fault signal on line 70 when the output phase current sense signals exceed a predetermined threshold for a predetermined period of time. The protection logic means 66 also monitor the rotor position control signal on line 54, and calculate the acceleration of the control permanent magnet generator. When the calculated acceleration exceeds a predetermined maximum acceleration rate, the protection logic means 66 generate the output protection fault signal on line 70.

Further, in accordance with the preferred embodiment of the instant invention, the electric power starter/generator 10 (see FIG. 1) comprises an excitation permanent magnet generator 74 having a rotor 38 driveably coupled to the shaft 14, and a stator 76 having polyphase multi-pole windings 44. The rotor 38 of this excitation permanent magnet generator 74 produces polyphase ac electric power when driven by the turbine engine via the shaft 14. In the preferred embodiment of the instant invention, the polyphase ac electric power comprises three-phase electric power. The electric power starter/generator 10 further comprises a controller 78, hereinafter generator control unit (GCU), having an input 80, coupled to the excitation permanent magnet generator 74, for receiving the three-phase ac electric power generated by the excitation permanent magnet generator 74. The controller generates an output voltage control signal.

Further, in accordance with the instant invention, the starter/generator 10 comprises a multi-pole ac synchronous generator 28 having a rotor 30 driveably coupled to the shaft 14, and a stator 32 having polyphase multi-pole windings 34. The ac synchronous generator produces polyphase ac electric power in response to the output voltage control signal generated by the controller 78 when driven by the turbine engine via shaft 14 in the generate mode. In the preferred embodiment of the instant invention, the polyphase ac electric power comprises three-phase electric power.

Figure 3:
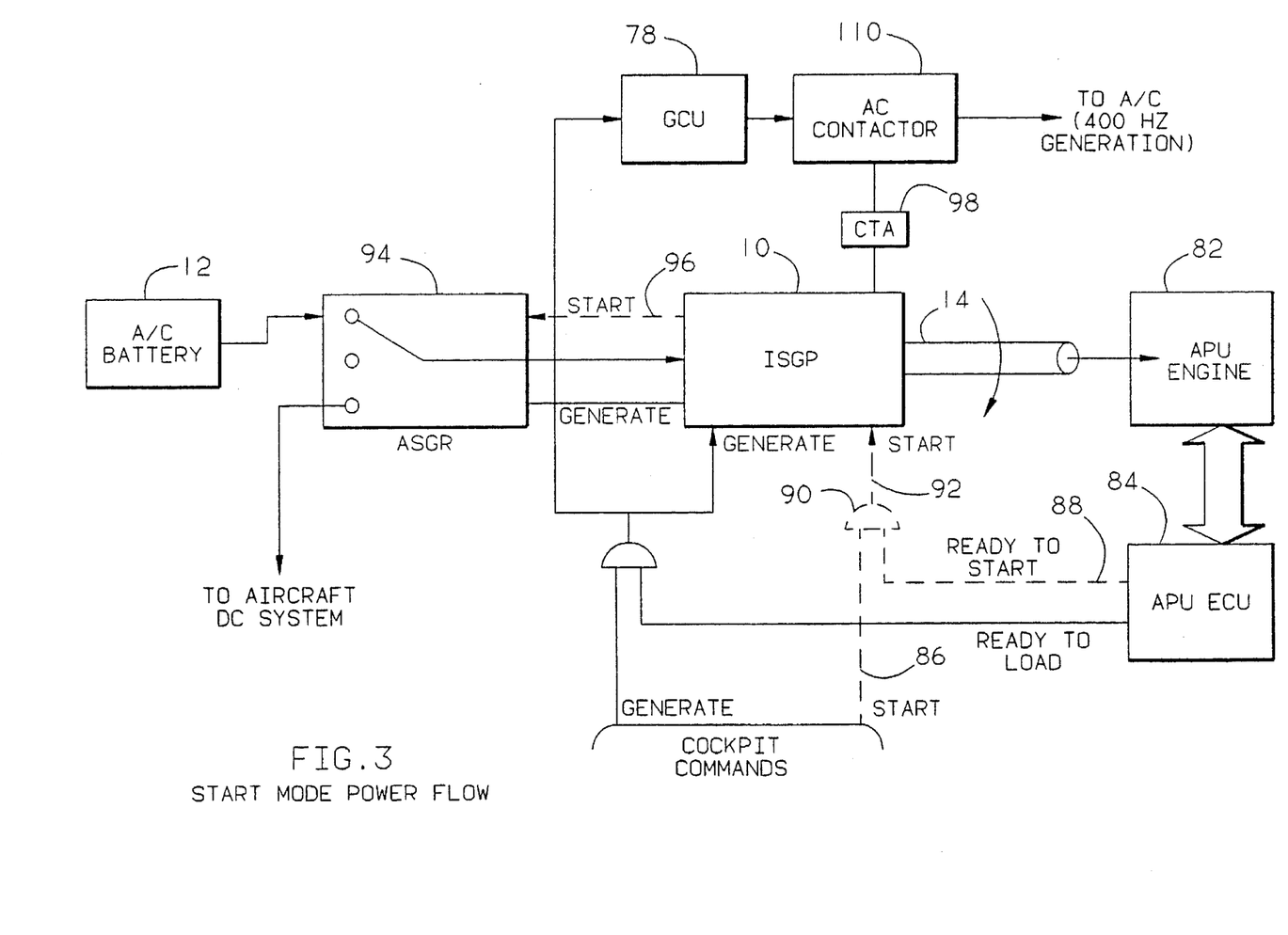
FIG. 3 is a single line schematic diagram of an auxiliary power unit (APU) based power system utilizing the electric power starter/generator of the instant invention illustrating the power flow in the start mode of operation.

The power flow from the aircraft battery 12 to the auxiliary power unit engine 82 during the start mode is shown in FIG. 3. The auxilliary power unit electronic control unit (APU ECU) 84 enables initiation of auxiliary power unit start. As in traditional auxiliary power unit starter configurations, the auxiliary power unit electronic control unit 84 ensures that auxiliary power unit 82 and aircraft configuration (inlet doors, auxiliary power unit engine conditions, etc.) are correct before allowing the start attempt. As shown in FIG. 3, a cockpit command to start via line 86 and the start enable signal via line 88 from the auxiliary power unit electronic control unit are both required at the input to and gate 90 to initiate the start sequence via line 92.

When start is commanded via line 92, the auxiliary power unit starter/generator relay (ASGR) 94 is commanded to close via line 96, connecting the aircraft battery 12 to the electric power starter/generator 10. The three electric power starter/generator internal elements which effect the start (see FIG. 1) are: the bidirectional ac-dc power converter 22; the permanent magnet synchronous machine 16; and the start mode controller 50. In combination, they convert the dc voltages and currents supplied by the battery 12 into ac voltages and currents required to accelerate the permanent magnet synchronous machine 16 and thus, via the shaft 14, the auxiliary power unit engine 82 (FIG. 3). When the auxiliary power unit engine 82 reaches starter cutout speed, the auxiliary power unit starter/generator relay 94 opens, and the start sequence is complete.

Figure 4:
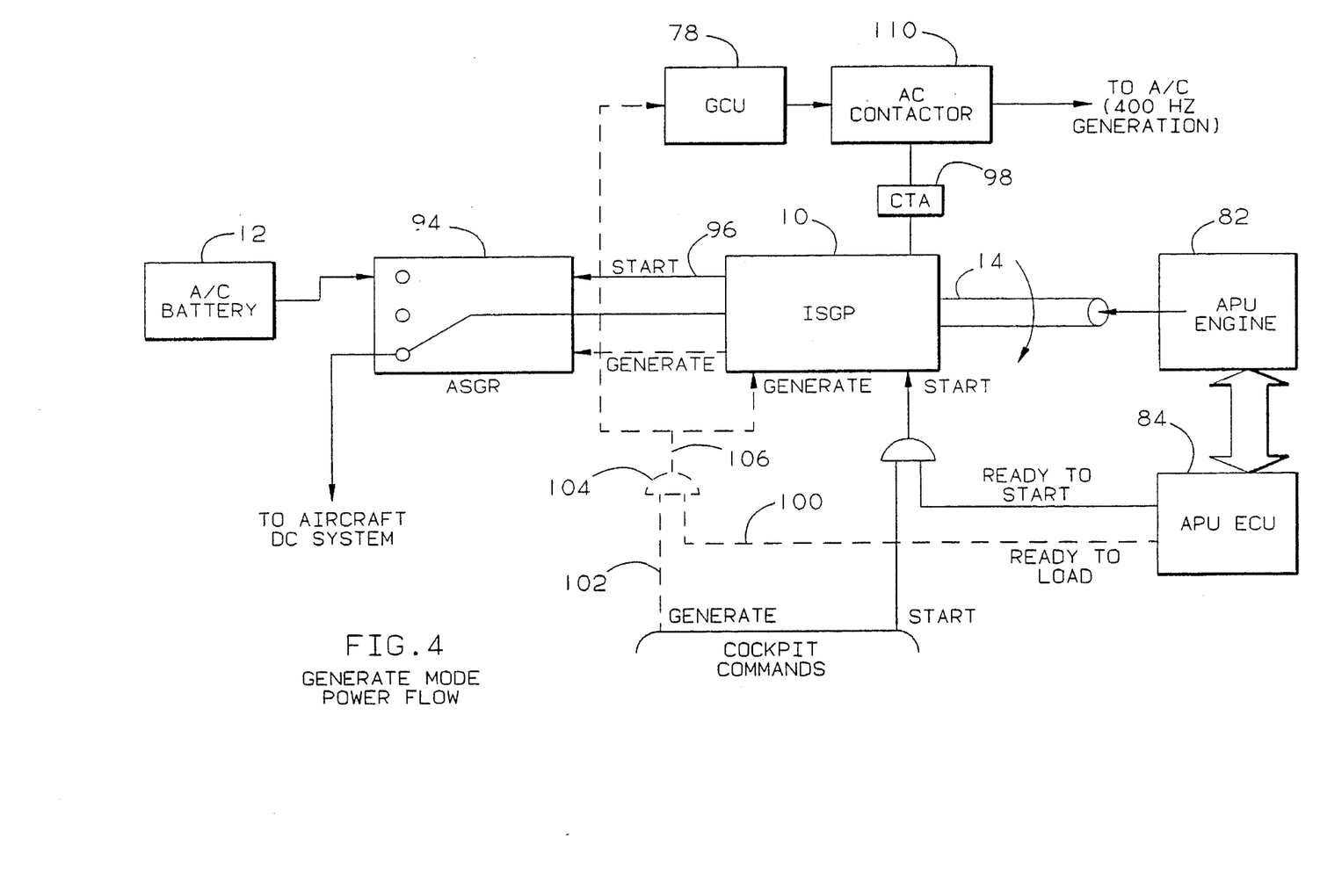
FIG. 4 is a single line schematic diagram of an auxiliary power unit (APU) based power system utilizing the electric power starter/generator of the instant invention illustrating the power flow in the generate mode of operation.

The power flow from the auxiliary power unit engine 82 to the ac and dc distribution systems during the generate mode is shown in FIG. 4. The electric power starter/generator 10 functions as a source of 115/200 volts 400 Hz ac, and 28 volt dc power when the auxiliary power unit 82 is at 100 percent speed, and power generation is requested. The auxiliary power unit engine 82 provides mechanical power to the electric power starter/generator 10, and the electric power starter/generator 10 in turn converts mechanical power into ac and dc electrical power. There are three internal electric power starter/generator elements which effect power generation, along with three external electric power starter/generator system line replaceable units (the 400 Hz controller 78, the current transformer assembly (CTA) 98, and the auxiliary power unit starter/generator relay 94). As shown in FIG. 1, the electric power starter/generator internal elements are: the separately excited rotating field ac synchronous machine 28; the permanent magnet synchronous machine 16; and the bidirectional ac-dc power converter 22.

The generation of power requires that the auxiliary power unit electronic control unit 84 issue an auxiliary power unit ready to load command via line 100, as depicted in FIG. 4, and a generate power command via line 102 initiated from the cockpit. Both signals are required to be present at the input to and gate 104 to initiate the generate sequence via line 106. The generator control unit 78 supplies field current to the exciter field 108 of the ac synchronous machine 28 to regulate the magnitude of the 400 Hz voltages supplied to the aircraft through the ac contactor 110. The generator control unit 78 controls the ac contactor 110 which connects the output of the ac synchronous generator 28 to the aircraft utilization equipment and effects traditional power quality protection.

DC power generation is accomplished with the same permanent magnet synchronous machine 16 and bidirectional ac-dc power converter 22 used for engine start (see FIG. 1). The three-phase ac voltages present at the terminals of the permanent magnet synchronous machine 16 are rectified by the bidirectional power load and then filtered to directly supply 28 volts dc to the series connected auxiliary power unit starter/generator relay 12. Closure of the auxiliary power unit starter/generator relay 12 connects this 28 volts dc supply to the aircraft 28 volt dc buses. No active control via the start mode controller 50 is required for dc power generation.

The bidirectional ac-dc power converter 22 operates in both start mode and the generate mode. It comprises a three-phase six switch full bridge power circuit which contains six bipolar transistors 112 with anti-parallel connected rectifiers 114. The transistors 112 are selected to carry the peak phase current delivered to the permanent magnet synchronous machine 16 during the starting interval. The anti-parallel rectifiers 114 are rated to carry the phase current developed by the permanent magnet synchronous machine 16 when operated in the generate mode. The base drive circuits 116 provide the required power gain to gate the transistors 112 into and out of conduction.

DC load fault protection is supplied by the auxiliary power unit starter/generator relay 94, functioning as a conventional thermal circuit breaker for the connected load. If the load requirements exceed the predefined current time threshold, the auxiliary power unit starter/generator relay 94 will open, thus disconnecting the external dc load. The use of the auxiliary power unit starter/generator relay 94 ensures that a fault on the ac bus will not disable dc power generation and that a fault on the dc bus will not disable ac power generation.

The electric power starter/generator 10 provides three phases of auxiliary power unit operation. First, the electric power starter/generator 10 starts the auxiliary power unit using 28 volt dc battery power by closing the auxiliary power unit starter/generator contactor 94, thereby applying 28 volts dc power to the electric power starter/generator dc terminals 24. Second, the integral bidirectional ac-dc power converter 22 and permanent magnet synchronous machine 16 then function as a brushless dc motor for controlled start sequence acceleration of the auxiliary power unit engine 82. Third, once the auxiliary power unit has accelerated to its rated speed, the electric power starter/generator 10 supplies 28 volt dc power to the aircraft dc system and 115/200 volts 400 Hz ac power to the aircraft ac system. Throughout the start and generate sequences described above, an independent oil system supplies cooling and lubrication within the electric power starter/generator 10.

Figure 5:
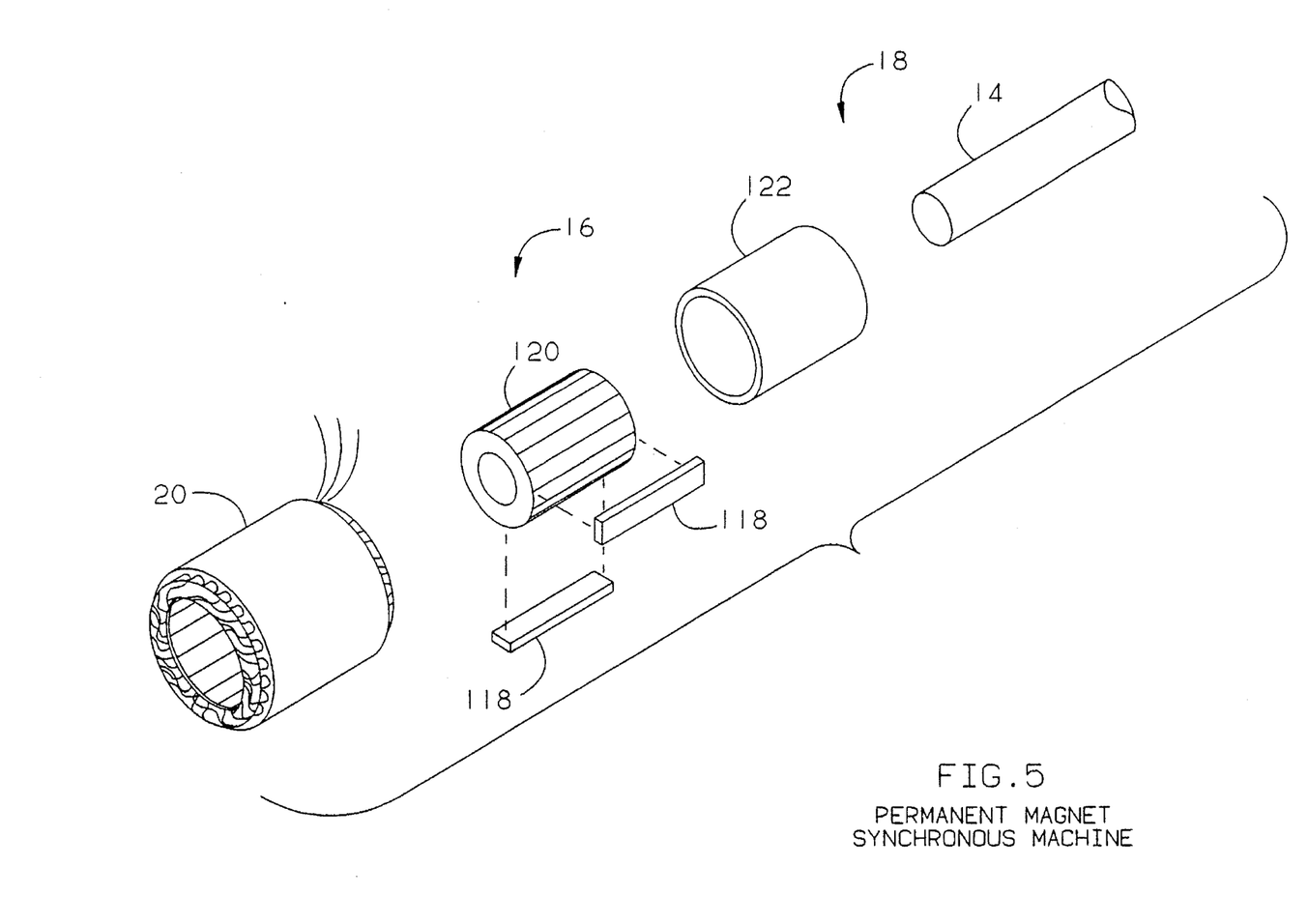
FIG. 5 illustrates a permanent magnet rotor constructed in accordance with the instant invention.
Figure 6:
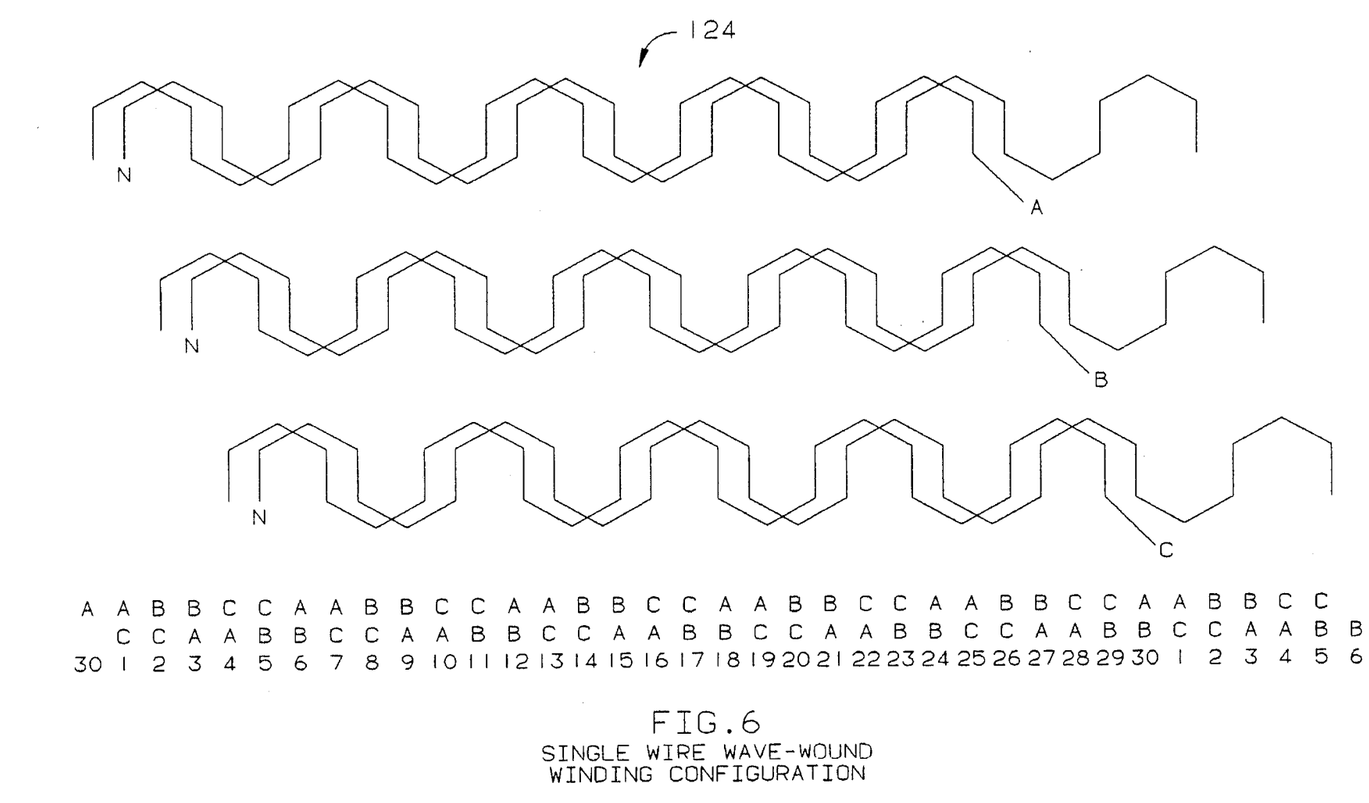
FIG. 6 illustrates the polyphase single wire wave-wound winding configuration of the permanent magnet synchronous machine of the instant invention.
Figure 7:
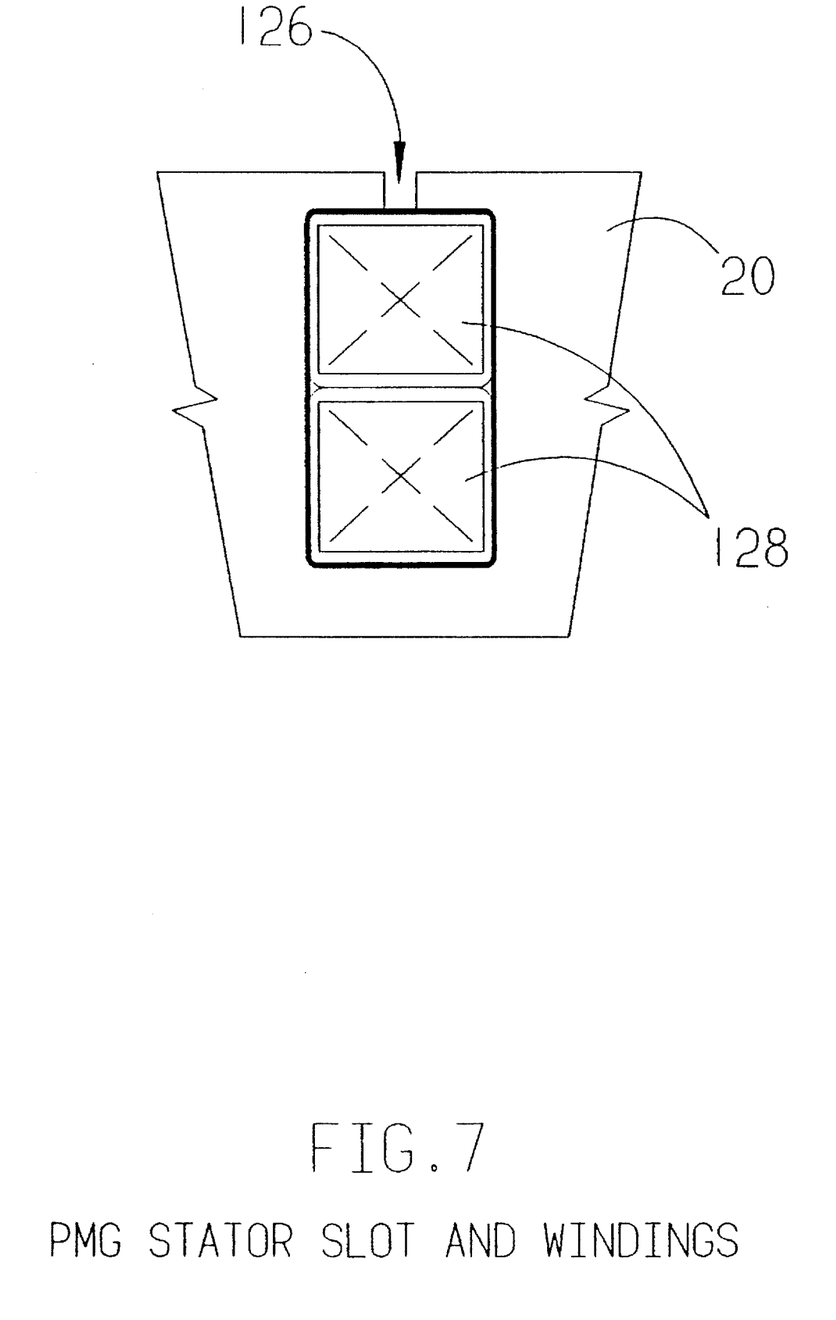
FIG. 7 is a cross sectional view of a slot of the permanent magnet synchronous machine's stator illustrating two rectangular windings housed therein.

The permanent magnet synchronous machine 16 shown in FIG. 5 produces shaft torque when functioning as a brushless dc motor during auxiliary power unit engine starting. This permanent magnet synchronous machine 16 also provides the 28 volt rectified dc power in the generate mode with the auxiliary power unit running at rated speed. The permanent magnet synchronous machine 16 comprises a plurality of permanent magnets 118 mounted on a magnetic steel hub 120 with a non-magnetic containment band shrunk over the magnets. Preferably ten samarium cobalt magnets are used. The magnets 118 are mounted with a magnetic orientation in a radial configuration with polarities alternately reversed from north to south poles around the rotor periphery. The permanent magnet synchronous machine's rotor 18 is then pressed on to the input shaft 14. The permanent magnet synchronous machine's stator 20 is constructed by electrically isolated wye-connected three-phase windings 124 utilizing a hairpin wave-wound winding configuration which has no jumpers (see FIG. 6). Two wires are utilized in each slot 126 with a rectangular 128 wire for maximum slot fill as shown in FIG. 7.

The control permanent magnet generator 36 (FIG. 1), which is smaller in size but similar in construction to the permanent magnet synchronous machine 16, is used to generate the internal voltages required to operate the electric power starter/generator 10, the generator control unit 78, and the auxiliary power unit electronic control unit 84 through the electric power starter/generator internal power supply (IPS) 130.

Figure 8:
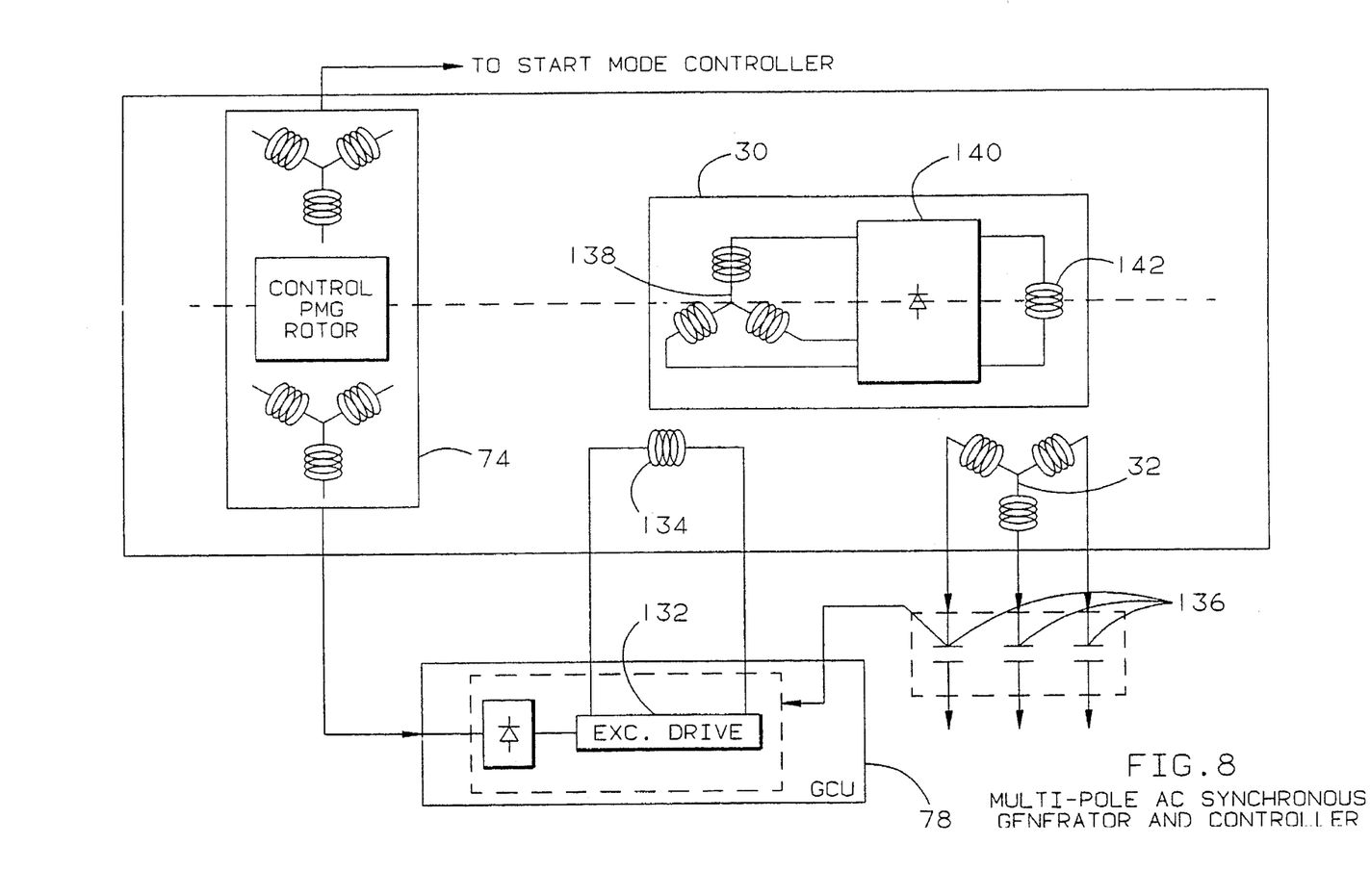
FIG. 8 is a single line schematic block diagram of the multi-pole ac synchronous generator of the instant invention.

The synchronous generator 28 shown in FIG. 8 is a two-pole design that converts the shaft power to constant frequency ac electrical power. The power generating process starts as the excitation permanent magnet generator 74 supplies a three-phase ac voltage which is converted to a dc voltage in the voltage regulator section 132 of the generator control unit 78. The voltage regulator 132 supplies an output voltage control signal to the stationary exciter field winding 134. A voltage signal from the ac distribution system point of regulation 136 is used by the voltage regulator 132 to regulate the applied output voltage contact signal, maintaining the required generating system output voltage throughout the required range of load current.

The rotor exciter load armature 138 develops a three-phase ac voltage which is rectified by a three-phase full-wave rotating rectifier assembly 140. This rectified dc voltage is applied directly to the main generator field 142 which energizes the main armature 32 and produces the three-phase 400 Hz ac output voltage.

A converter input EMI filter 142 (FIG. 1) is provided to attenuate ac noise distortion and high frequency emissions in the generate mode on the 28 volt dc power bus. The filter 142 also provides protection against continuous conducted noise in transient susceptibility threats to prevent upset of the bipolar junction transistors 112. A differential mode filtering network and a common mode filtering network are contained in an integrated subassembly 142, impedance matched to the converter 22.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric power starter/generator for converting electrical energy from a remote dc electrical power source to mechanical energy to start a turbine engine in the start mode, and for converting mechanical energy from the turbine engine to electrical energy to power utilization equipment in the generate mode, comprising:

a mechanical energy coupling means for transferring rotational mechanical energy between said electric power starter/generator and the turbine engine;

a permanent magnet synchronous machine having a rotor driveably coupled to said mechanical energy coupling means and a stator; and a bidirectional ac-dc power converter having a dc input/output and an ac input/output, said dc input/output coupled to the remote dc source, said ac input/output coupled to said stator of said permanent magnet synchronous machine, said power converter producing variable frequency polyphase ac excitation at said ac input/output from the dc electrical energy at said dc input/output to drive said permanent magnet synchronous machine as a brushless dc motor to generate rotational mechanical energy to start the turbine engine via said mechanical energy coupling means during the start mode, said power converter alternately producing dc electrical energy at said dc input/output from polyphase ac electrical energy at said ac input/output generated by said permanent magnet synchronous machine when driven by the turbine engine via said mechanical energy coupling means during the generate mode.

2. An electric power starter/generator as recited in claim 1, wherein said stator comprises poly-phase hairpin wavewound windings requiring no jumper wires, said windings housed two per slot within said stator.

3. An electric power starter/generator as recited in claim 1, wherein said rotor comprises a plurality of permanent magnets having a radial magnetic orientation of alternating polarities about the periphery of said rotor.

4. An electric power starter/generator as recited in claim 1, wherein said bidirectional ac-dc power converter comprises at least two power switches per phase switchably coupling said dc input/output to said ac input/output, and proportional base drive circuitry having a control input and a drive output, said proportional base drive circuitry gating said power switches into and out of conduction during the start mode.

5. An electric power starter/generator as recited in claim 4, wherein said bidirectional ac-dc power converter further comprises at least one rectifier coupled in antiparallel orientation across each of said power switches, said rectifiers converting said polyphase ac electric power produced by said permanent magnet synchronous machine into dc electric power during the generate mode.

6. An electric power starter/generator as recited in claim 4, wherein said bidirectional ac-dc power converter further comprises a filter coupled to said dc input/output for attenuating ac noise distortion and high frequency emissions in the generate mode, said filter further protecting said high power switches from continuous conducted noise and transient susceptibility threats.

7. An electric power starter/generator as recited in claim 1, further comprising:
   a control permanent magnet generator having a rotor driveably coupled to said mechanical energy coupling means and a stator having polyphase multi-pole windings, said rotor of said control permanent magnet generator comprising a plurality of permanent magnets mechanically aligned with said magnets of said rotor of said permanent magnet synchronous machine, said control permanent magnet generator producing polyphase ac electric power when driven by the turbine engine via said mechanical energy coupling means;
   phase current sensors for sensing electrical current generated by each phase of said permanent magnet synchronous machine, said phase current sensors generating output phase current sense signals of proportional magnitude to the phase current sensed thereby; and
   a start mode controller in communication with said power converter, and responsive to said polyphase ac electric power generated by said control permanent magnet generator and to said output phase current sense signals for controlling the rate of generation of rotational mechanical energy delivered to the turbine engine resulting in motor torque and hence acceleration of the turbine engine in the start mode, said start mode controller comprising,
      a rotor position detection means coupled to said control permanent magnet generator for sensing the position of said rotor of said control permanent magnet generator, said rotor position detection means generating a rotor position control signal to ensure phase lock of said variable frequency polyphase ac excitation produced by said power converter with said permanent magnet synchronous machine during the start mode,
      a torque regulator having a phase current input coupled to said phase current sensors for monitoring said output phase current sense signals, said torque regulator producing an output torque regulation control signal based on said output phase current sense signals and on a predetermined acceleration profile, and
      a modulator coupled to said rotor position detection means and to said torque regulator, said modulator producing power converter drive commands responsive to said rotor position control signal and to said output torque regulation control signal.

8. An electric power starter/generator as recited in claim 7, wherein said rotor position detection means comprises a closed loop frequency control, said rotor position detection means controlling the frequency of said variable frequency polyphase ac excitation to ensure phase lock with the frequency of said permanent magnet synchronous machine.

9. An electric power starter/generator as recited in claim 7, wherein said torque regulator comprises a closed loop permanent magnet synchronous motor phase current controller.

10. An electric power starter/generator as recited in claim 7, further comprising protection logic means for detecting failures within said electric power starter/generator, said protection logic means comprising,
   at least one temperature sensor positioned within said electric power starter/generator for monitoring the temperature of said electric power starter/generator, said protection logic means generating an output protection fault signal when said temperature exceeds a predetermined threshold, and wherein
   said protection logic means monitors said output phase current sense signals and generates said output protection fault signal when said output phase current sense signals exceed a predetermined threshold for a predetermined period of time, and wherein
   said protection logic means monitors said rotor position control signal, calculates the acceleration of said control permanent magnet generator therefrom, and generates said output protection fault signal when said calculated acceleration exceeds a predetermined maximum acceleration rate.

11. An electric power starter/generator as recited in claim 7, further comprising operational logic means for enabling and disabling production of said variable frequency ac excitation, said operational logic means enables said production upon receipt of an externally generated turbine engine start command, disables said production in response to said output protection fault signal, and disables said production upon determining that the speed of said control permanent magnet generator, calculated from said rotor position output signal, exceeds a predetermined threshold.

12. An electric power starter/generator as recited in claim 1, further comprising:
   an excitation permanent magnet generator having a rotor driveably coupled to said mechanical energy coupling means and a stator having polyphase multi-pole windings, said rotor of said excitation permanent magnet generator comprising a plurality of permanent magnets mechanically aligned with said magnets of said rotor of said permanent magnet synchronous machine, said excitation permanent magnet generator producing polyphase ac electric power when driven by the turbine engine via said mechanical energy coupling means;

a means for controlling said excitation permanent magnet generator having an input coupled to said excitation permanent magnet generator for receiving said polyphase ac electric power generated by said excitation permanent magnet generator, said means generating an output voltage control signal; and a multi-pole ac synchronous generator having a rotor driveably coupled to said mechanical energy coupling means, a stator having polyphase multi-pole windings, and a stationary exciter field winding coupled to and electrically excited by said output voltage control signal to generate a first electromagnetic field, said ac synchronous generator producing polyphase ac electric power in response to said output voltage control signal being applied to said stationary exciter field winding when driven by the turbine engine via said mechanical energy coupling means.

13. An electric power starter/generator as recited in claim 12, wherein said multi-pole ac synchronous generator comprises:

a multi-phase rotating exciter armature driveably coupled to said mechanical energy coupling means and electromagnetically coupled to said stationary exciter field winding, said rotating exciter armature producing multi-phase ac electric power in response to said first electromagnetic field;

a rotating rectifier assembly electrically coupled to said rotating exciter armature and mechanically coupled to said mechanical energy coupling means, said rotating rectifier assembly transforming said multi-phase ac electric power produced by said rotating exciter armature into a single phase dc electric power signal;

a main generator rotating field winding electrically coupled to said rotating rectifier assembly and mechanically driven by said mechanical energy coupling means, said main generator rotating field winding generating a second electromagnetic field in response to said single phase dc electric power signal; and a multi-phase main generator stator winding excited by said second electromagnetic field, said main generator stator producing multi-phase ac electric power to power utilization equipment connected thereto.

14. An electric power starter/generator for converting electrical energy from a 28 volts dc aircraft battery to mechanical energy to start an turbine engine in the start mode, and for converting mechanical energy from the turbine engine to electrical energy to power utilization equipment in the generate mode, comprising:

a shaft for transferring rotational mechanical energy between said electric power starter/generator and the turbine engine;

a low voltage/high current permanent magnet synchronous machine having a rotor driveably coupled to said shaft and a stator; and a bidirectional six-pulse ac-dc power converter having a dc input/output and an ac input/output, said dc input/output coupled to the 28 volts dc battery, said ac input/output coupled to said stator of said permanent magnet synchronous machine, said power converter producing variable frequency three-phase ac excitation at said ac input/output from the 28 volts dc electrical energy at said dc input/output to drive said permanent magnet synchronous machine as a three-phase brushless dc motor to generate rotational mechanical energy to start the turbine engine via said shaft during the start mode, said power converter alternately producing 28 volts dc electrical energy at said dc input/output from three-phase ac electrical energy at said ac input/output generated by said permanent magnet synchronous machine when driven by the turbine engine via said shaft during the generate mode.

15. An electric power starter/generator as recited in claim 14, wherein said stator comprises an electrically isolated wye connected 3-phase windings utilizing a hairpin wave-wound winding configuration requiring no jumper wires, said windings housed two per slot within said stator.

16. An electric power starter/generator as recited in claim 15, wherein each phase of said windings comprises a single rectangular wire.

17. An electric power starter/generator as recited in claim 14, wherein said rotor comprises, a magnetic steel hub, a plurality of permanent magnets having a radial magnetic orientation of alternating polarities mounted on the periphery of said magnetic steel hub, and a non-magnetic containment band fixably attached to the outer periphery formed by said permanent magnets.

18. An electric power starter/generator as recited in claim 17, wherein said permanent magnets comprise samarium cobalt.

19. An electric power starter/generator as recited in claim 14, wherein said bidirectional six-pulse ac-dc power converter comprises at least two transistors per phase switchably coupling said 28 volts dc input/output to said ac input/output, and proportional base drive circuitry having a control input and a drive output, said proportional base drive circuitry gating said transistors into and out of conduction during the start mode.

20. An electric power starter/generator as recited in claim 19, wherein said transistors are sized to conduct the peak phase current delivered to said permanent magnet synchronous machine during the generate mode.

21. An electric power starter/generator as recited in claim 19, wherein said bidirectional six-pulse ac-dc power converter further comprises at least one rectifier coupled in antiparallel orientation across each of said transistors, said rectifiers converting said three-phase ac electric power produced by said permanent magnet synchronous machine into 28 volts dc electric power during the generate mode when the turbine engine is operating at rated speed.

22. An electric power starter/generator as recited in claim 19, wherein said bidirectional six-pulse ac-dc power converter further comprises a filter coupled to said 28 volts dc input/output for attenuating ac noise distortion and high frequency emissions in the generate mode, said filter further protecting said transistors from continuous conducted noise and transient susceptibility threats, said filter comprising a differential mode filtering network and a common mode filtering network impedance matched to said bidirectional six-pulse ac-dc power converter.

23. An electric power starter/generator as recited in claim 14, further comprising:

a control permanent magnet generator having a rotor driveably coupled to said shaft and a stator having three-phase multi-pole windings, said rotor of said control permanent magnet generator comprising a plurality of permanent magnets mechanically aligned with said magnets of said rotor of said permanent magnet synchronous machine, said control permanent magnet generator producing three-phase ac electric power when driven by the turbine engine via said shaft;

phase current sensors for sensing electrical current generated by each phase of said permanent magnet synchronous machine, said phase current sensors generating output phase current sense signals of proportional magnitude to the phase current sensed thereby; and a start mode controller in communication with said power converter, and responsive to said three-phase ac electric power generated by said control permanent magnet generator and to said output phase current sense signals for controlling the rate of generation of rotational mechanical energy delivered to the turbine engine resulting in motor torque and hence acceleration of the turbine engine in the start mode, said start mode controller comprising, a rotor position detection means coupled to said control permanent magnet generator for sensing the position of said rotor of said control permanent magnet generator, said rotor position detection means generating a rotor position control signal to ensure phase lock of said variable frequency three-phase ac excitation produced by said power converter with said permanent magnet synchronous machine during the start mode, a torque regulator having a phase current input coupled to said phase current sensors for monitoring said output phase current sense signals, said torque regulator producing an output torque regulation control signal based on said output phase current sense signals and on a predetermined acceleration profile, and a modulator coupled to said rotor position detection means and to said torque regulator, said modulator producing power converter drive commands responsive to said rotor position control signal and to said output torque regulation control signal.

24. An electric power starter/generator as recited in claim 23, wherein said rotor position detection means comprises a closed loop frequency control, said rotor position detection means controlling the frequency of said variable frequency three-phase ac excitation to ensure phase lock with the frequency of said permanent magnet synchronous machine.

25. An electric power starter/generator as recited in claim 23, wherein said torque regulator comprises a closed loop permanent magnet synchronous motor phase current controller.

26. An electric power starter/generator as recited in claim 23, further comprising protection logic means for detecting failures within said electric power starter/generator, said protection logic means comprising, at least one temperature sensor positioned within said electric power starter/generator for monitoring the temperature of said electric power starter/generator, said protection logic means generating an output protection fault signal when said temperature exceeds a predetermined threshold, and wherein said protection logic means monitors said output phase current sense signals and generates said output protection fault signal when said output phase current sense signals exceed a predetermined threshold for a predetermined period of time, and wherein said protection logic means monitors said rotor position control signal, calculates the acceleration of said control permanent magnet generator therefrom, and generates said output protection fault signal when said calculated acceleration exceeds a predetermined maximum acceleration rate.

27. An electric power starter/generator as recited in claim 23, further comprising operational logic means for enabling and disabling production of said variable frequency ac excitation, said operational logic means enables said production upon receipt of an externally generated turbine engine start command, disables said production in response to said output protection fault signal, and disables said production upon determining that the speed of said control permanent magnet generator, calculated from said rotor position output signal, exceeds a predetermined threshold.

28. An electric power starter/generator as recited in claim 14, further comprising:

an excitation permanent magnet generator having a rotor driveably coupled to said shaft and a stator having three-phase multi-pole windings, said rotor of said excitation permanent magnet generator comprising a plurality of permanent magnets mechanically aligned with said magnets of said rotor of said permanent magnet synchronous machine, said excitation permanent magnet generator producing three-phase ac electric power when driven by the turbine engine via said shaft;

a controller having an input coupled to said excitation permanent magnet generator for receiving said three-phase ac electric power generated by said excitation permanent magnet generator, said controller generating an output voltage control signal; and a multi-pole ac synchronous generator having a rotor driveably coupled to said shaft and a stator having three-phase multi-pole windings, said ac synchronous generator producing three-phase ac electric power in response to said output voltage control signal when driven by the turbine engine via said shaft.

29. An electric power starter/generator as recited in claim 28, wherein said multi-pole ac synchronous generator comprises:

a stationary exciter field winding coupled to and electrically excited by said output voltage control signal, said stationary exciter field winding generating a first electromagnetic field in response thereto;

a three-phase rotating exciter armature driveably coupled to said shaft and electro-magnetically coupled to said stationary exciter field winding, said rotating exciter armature producing three-phase ac electric power in response to said first electromagnetic field;

a rotating rectifier assembly electrically coupled to said rotating exciter armature and mechanically coupled to said shaft, said rotating rectifier assembly transforming said three-phase ac electric power produced by said rotating exciter armature into a single phase dc electric power signal;

a main generator rotating field winding electrically coupled to said rotating rectifier assembly and mechanically driven by said shaft, said main generator rotating field winding generating a second electromagnetic field in response to said single phase dc electric power signal; and a three-phase main generator stator winding excited by said second electromagnetic field, said main generator stator producing three-phase ac electric power to power utilization equipment connected thereto.

\* \* \* \* \*